Oct. 8, 1935.  A. L. BARNES  2,016,937
CAMERA AND METHOD OF PHOTOGRAPHY
Filed Nov. 2, 1933   2 Sheets-Sheet 1
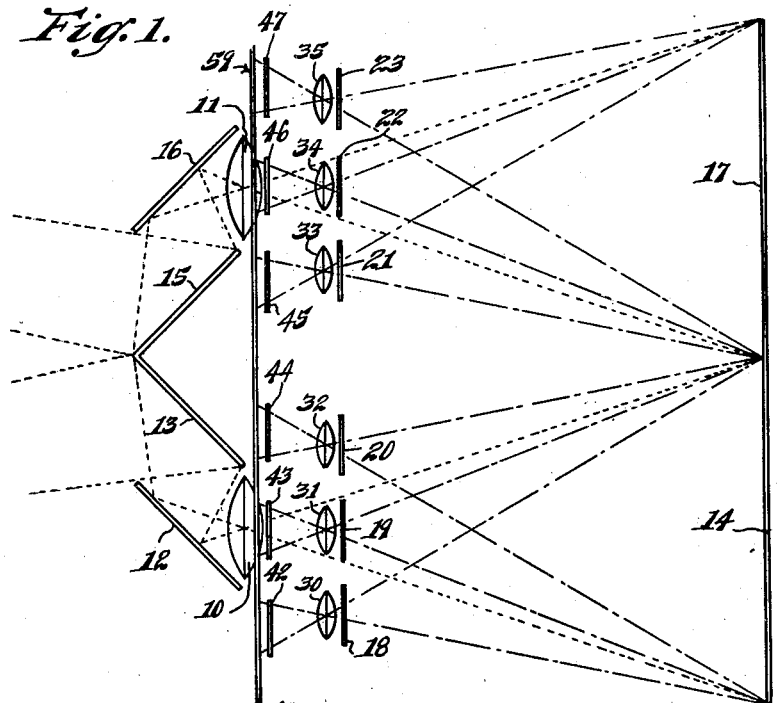
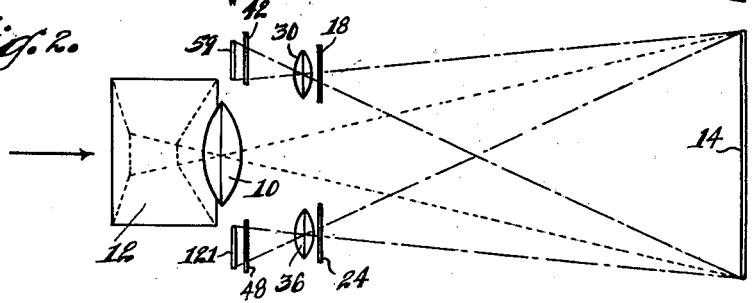
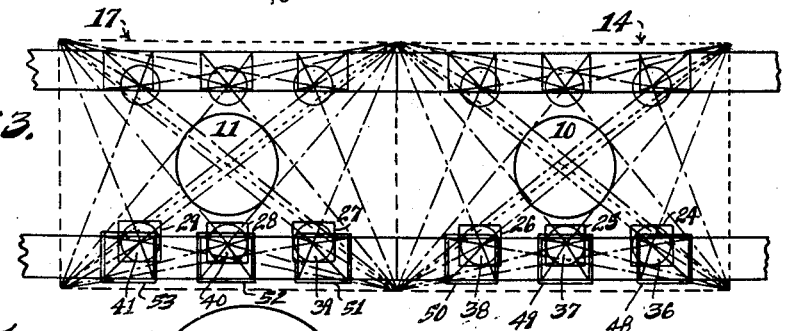
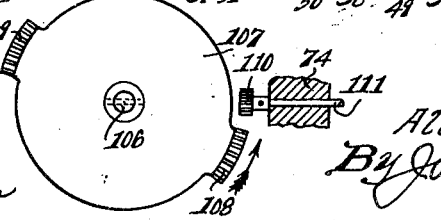

Oct. 8, 1935.　　　A. L. BARNES　　　2,016,937
CAMERA AND METHOD OF PHOTOGRAPHY
Filed Nov. 2, 1933　　2 Sheets-Sheet 2
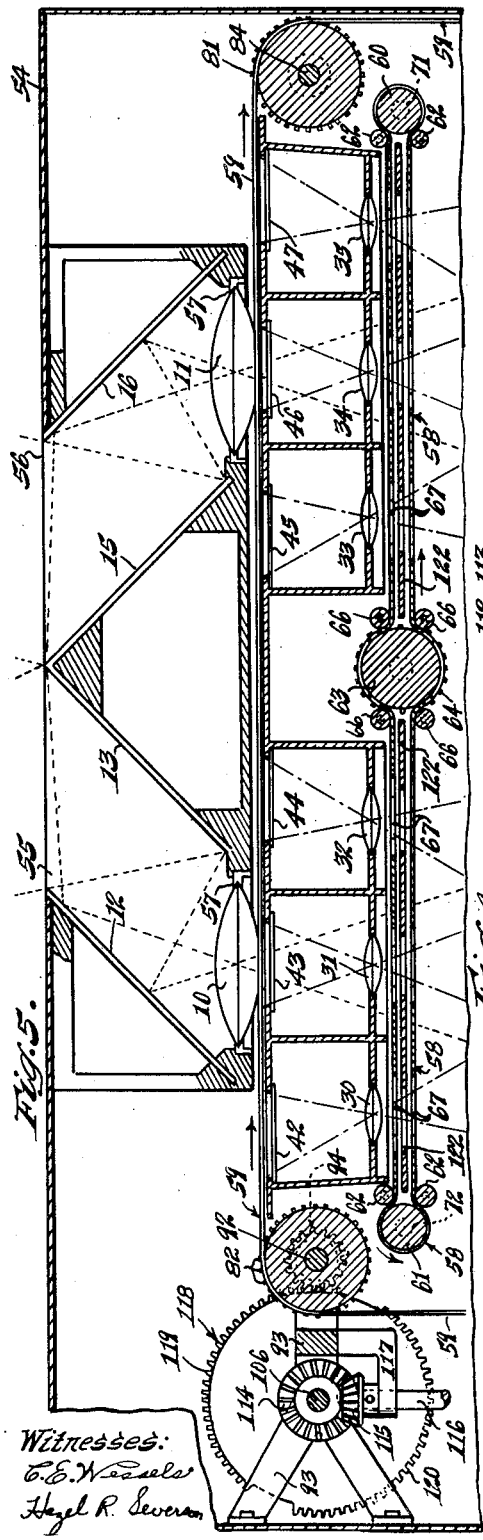
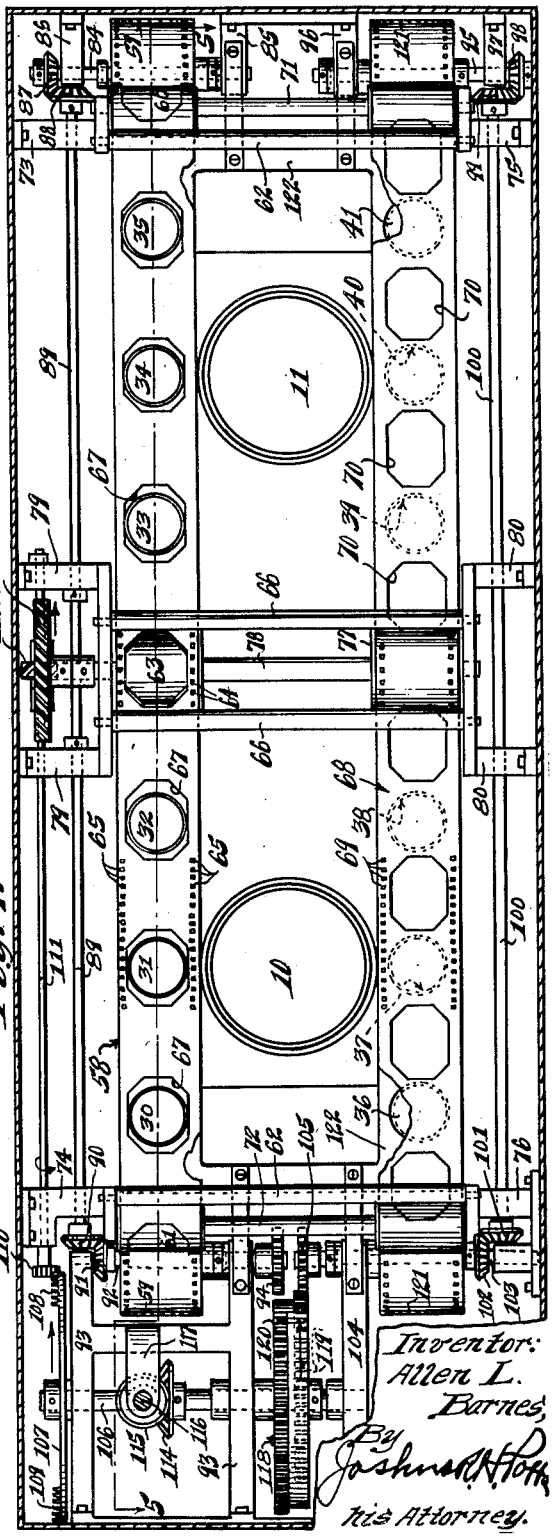
Witnesses:
C. E. Wessels
Hazel R. Severn
Inventor:
Allen L. Barnes,
By Joshua R. H. Potts
his Attorney.

Patented Oct. 8, 1935

2,016,937

UNITED STATES PATENT OFFICE 2,016,937

CAMERA AND METHOD OF PHOTOGRAPHY

Allen L. Barnes, Oak Park, Ill., assignor, by direct and mesne assignments, to Joseph H. Hinshaw, trustee, Wilmette, Ill.

Application November 2, 1933, Serial No. 696,313

9 Claims. (Cl. 88—16.6)

My invention relates to improvements in cameras and methods of photography and has for a particular object the provision of a device and method which are particularly adapted for use in stereoscopic photography and preferably in color stereoscopic photography where a plurality of monochrome images of the object appearing in color are recorded on panchromatic film at the same time; the positives made from this panchromatic film are then projected upon a screen through apparatus in such a manner as to produce an image on the screen which reproduces the object in color and steroscopic effect.

It is well known that stereoscopic photography requires the photographing of the object from two different points of view so as to obtain the sense of perspective which the separated eyes of the individual give to the observer. When the objects are moving it is indispensable that the records made from different points of view should be made at precisely the same instant of time just as each of the two eyes would perceive the object at that instant in order to comprehend a third dimension. Although the history of the stereoscope and the principle of binocular vision have been known longer than the art of photography it has never taken an important place in photography. Color photography which has been known for a great many years also has not yet become practical in the chief fields of photography.

Therefore this is my chief aim of this invention, to make possible the combining of color photography and third dimension pictures for the purpose of projection as well as for any other purpose to which they might be adapted.

A further object is to so place pictures on the film so that a continuous sequence of images are thrown on the screen at all times from each of the binocular receptions, thereby increasing the illumination and tending to make for more perfect pictures.

Also I have in mind the object of elimination of lost time in exposure which occurs in the case of the present rotary shutter, thereby giving a greater breadth to the time of exposure which is so essential when using color filters, although for the lenses using the more dense color filters I propose to use faster lenses. By this arrangement I will be able to produce more pictures per second and thereby secure more perfect vision and illumination as well as the simplification of the requirements for projection of these pictures.

A further object in this invention is to make possible variation of and wider spacing of the binocular lenses without sacrificing the advantages of the correct interpupilary separation as required for the most perfect third dimension effect. In accomplishing this I am able to introduce a larger reception screen behind the binocular lenses as well as other photographic means as required to make the desired color pictures and place them correctly upon the screen.

A further object in this invention is to secure a desired synchronic action of movement of the film within the camera and to secure the correct synchronic relation of the movement of that film and the exposing means.

Other objects will appear hereinafter.

My invention may be best understood by reference to the accompanying drawings, in which:

Fig. 1 is a diagrammatic view of my preferred arrangement of apparatus;

Fig. 2 is a diagrammatic end elevational view;

Fig. 3 is a diagrammatic front elevational view;

Fig. 4 is a longitudinal, central, sectional view of my preferred form of apparatus;

Fig. 5 is a sectional view taken substantially on the line 5—5 of Fig. 4; and

Fig. 6 is a detail view of parts of the shutter operating mechanism.

I refer now to Fig. 1 which is a diagrammatic layout of the mechanism preferably employed. A pair of spaced main lenses 10 and 11 are employed for receiving light rays from the photographed object from two different points of view, and preferably these points of view should not be farther apart than the eyes of the average individual. However, for reasons later to be described, I prefer to place the lenses a greater distance apart than the distance between the eyes of the average individual and hence employ catoptric means for receiving the light rays from the image and reflecting or refracting them to the spaced lenses 10 and 11. The catoptric means employed should be so arranged and constructed that they receive the light rays from the object at two points of view which are approximately not more than five inches distant from each other. A pair of mirrors 12 and 13 may be arranged in parallel planes with their reflecting surfaces facing each other and placed at such an angle that they direct the light rays laterally so that they may be received by lens 10 and focused on receiving screen 14. A pair of oppositely arranged mirrors 15 and 16 are arranged and constructed to direct light rays laterally to lens 11 by which they are focused on screen 17. Hence, it can be seen that the images appearing on screens 14 and 17 are accurate images of the object when viewed from two separated points of view. However, the distance between the points of view is not the distance between lenses 10 and 11, but is only the distance between the catoptric means employed.

It can now be seen that if the images on screens 14 and 17 are photographed, each photograph will record the same subject matter although the perspective of one will be different from the other. From screens 14 and 17 light rays of the image proceed forwardly to shutters 18, 19, 20, 21, 22, and 23. A similar series of shutters are placed immediately below the series just mentioned and are given the reference numerals 24, 25, 26, 27, 28, and 29. If the shutters are "open" the light rays pass forwardly to lenses 30, 31, 32, 33, 34, and 35, and to a lower series of similar lenses given reference numerals 36, 37, 38, 39, 40, and 41. From the lenses just mentioned the light rays pass forwardly through color filters 42, 43, 44, 45, 46, and 47 and through a lower similar series of filters 48, 49, 50, 51, 52, and 53. From the filters just mentioned the light rays proceed to various frames of panchromatic film and each frame carries a monochrome record of the image appearing on screen 14 or 17.

It can be seen that simultaneous exposure of all the frames of film would produce duplicate monochrome records of the images on screens 14 and 17, but it is of course understood that such a result would serve no useful purpose. By timed operation of the upper and lower shutters, however, I am able to expose the upper row of frames and at the same time advance the lower row of frames for a subsequent exposure thereof. By such alternate and successive exposure and advancement several specific advantages later to be described are achieved.

The mechanism and method by which successive and alternate exposure and advancement of the rows of frames are accomplished as described in connection with Figs. 4 and 5. My apparatus preferably is increased in a housing 54 having a pair of spaced apertures 55 and 56 for the admission of light rays to mirrors 12, 13, 15, and 16. Appropriate vertically extending frame members support each of the mirrors in proper relation to each other so that the light rays received may be directed laterally to main lenses 10 and 11. Main lenses 10 and 11 may be anchored in supporting rings 57. From main lenses 10 and 11 the light rays proceed rearwardly to screens 14 and 17 shown diagrammatically in Fig. 1, and the light rays of the images on said screens proceed forwardly as shown particularly in Figs. 1 and 2. However, my shutter mechanism intercepts the light rays from the images at successive intervals and prevents their passage to the lenses heretofore desribed. As heretofore stated I preferably expose one series of frames while advancing another series of frames into proper position for exposure and consequently I preferably employ a separate film for each series of frames and a separate shutter for each film. An upper shutter 58 is employed for upper film 59, and film 59 is exposed to the light rays being transmitted by the upper series of lenses 30, 31, 32, 33, 34, and 35. Each of the lenses just mentioned is located in an appropriate housing so that the rays transmitted by the member proceed directly to the filters 42, 43, 44, 45, 46, and 47 and thence to film 59 without any interference from stray light rays.

Shutter 58 is preferably made in a form of a continuous belt arranged to travel around and on spaced end drums 60 and 61. Aligning rollers 62 extend vertically and are arranged close to drums 60 and 61 so that opposite portions of the belt shutter may be caused to travel in closely spaced parallel planes. Substantially equidistant the drums 60 and 61 is arranged a driving drum 63 of greater diameter than drums 60 and 61. The drum 63 is provided with two spaced annular series of teeth 64 which are adapted to engage appropriate apertures 65 in shutter belt 58. Vertical rollers 66 are arranged close to drum 63 so as to cause the opposite portions of the belt 58 to travel in closely spaced parallel planes in a manner similar to that heretofore described in connection with rollers 62. A series of rectilinearly spaced apertures are formed in belt 58 at equally spaced positions throughout its length.

The lower shutter 68 is constructed in a manner similar to that of shutter belt 58 and is also provided with a series of tooth-engaging apertures 69 and film exposure apertures 70. Lower shutter belt 68 travels on lower drums which are similar to drums 60 and 61 shown particularly in Fig. 5. The upper drums 60 and 61 and the lower drums which are similar thereto are mounted on vertical shafts 71 and 72 whose ends may be anchored in appropriate bearings in upper brackets 73 and 74 and in lower brackets 75 and 76. The rollers 62 extend downwardly a sufficient distance so as to cooperate with the lower drums, and the ends of said rollers are anchored in bearings which are supported by brackets 73, 74, 75, and 76. A lower driving drum 77 is similar in all respects to upper drum 63, and a vertically extending shaft 78 has upper drum 63 and lower drum 77 keyed thereto at points adjacent the upper and lower ends respectively. Shaft 78 is anchored in bearings which are supported by upper bracket 79 and lower bracket 80. The rollers 66 extend downwardly a sufficient distance to cooperate with drum 77 in the same way that they cooperate with drum 63, and the ends of rollers 66 are anchored in bearings supported by brackets 79 and 80.

Forwardly of the shutter belts upper film driving sprockets 81 and 82 may be arranged for receiving and driving upper film 59. Sprocket 81 is mounted on a vertically extending shaft 84 which receives bearing support in brackets 85 and 86, and a bevel gear 87 is keyed to shaft 84 and meshes with a bevel gear 88. Gear 88 is keyed to a horizontally extending shaft 89 which receives bearing support in brackets 73, 79, and 74, and has a bevel gear 90 keyed thereto adjacent the end opposite gear 88. A bevel gear 91 meshes with gear 90 and is keyed to a vertically extending shaft 92 which receives bearing support adjacent its opposite ends from a bracket 93 which is mounted on the side wall of the housing. The film sprocket 82 is keyed to shaft 92, and shaft 92 has a driving pinion 94 keyed thereto adjacent the end opposite gear 91. A lower film driving sprocket is located immediately below sprocket 81 and is keyed to a vertically extending shaft 95 which receives bearing support in brackets 96 and 97. A bevel gear 98, similar to gear 87, is keyed to shaft 95 and meshes with a gear 99 which is similar to gear 88. The gear 99 is keyed to a horizontally extending shaft 100 which receives bearing support in brackets 75, 80, and 76. A bevel gear 101 is keyed to the end of shaft 100 opposite the gear 99 and meshes with a bevel gear 102 which is keyed to a vertically extending shaft 103 which receives bearing support from brackets 76 and 104. The upper end of shaft 103 has a driving pinion 105 keyed thereto.

A vertically extending shaft 106 is spaced laterally of shafts 92 and 103 and receives bearing support from brackets 93 and 104. Adjacent the upper end of shaft 106 is keyed a segmental gear 107 having two sets of teeth 108 and 109. Each of the sets of teeth 108 and 109 meshes with a pinion 110 which is mounted on the end of a horizontally extending shaft 111 which receives bearing support in brackets 74 and 79. Adjacent the inner end of shaft 111 is keyed a helical gear 112 for rotation about a horizontal axis. The gear 112 meshes with a helical gear 113 which lies in a horizontal plane and is keyed to the upper end of shaft 78.

Substantially centrally of shaft 106 may be keyed a bevel gear 114 which in turn meshes with a bevel gear 115. The gear 115 is keyed to a power shaft 116. The shaft 116 receives bearing support from a bracket 117 which is in turn supported by bracket 93.

A segmental gear 118 is keyed to shaft 106 adjacent its lower end and is provided with two segmental sets of teeth 119 and 120 which are spaced vertically and arranged diametrically opposite each other on gear 118. The teeth 119 mesh with and drive pinion 105 which causes movement of lower film 121, and teeth 120 mesh with pinion 94 to cause the rotation of shaft 82 and the consequent advancement of upper film 59.

A stationary light obstructing and admitting plate 122 is supported by laterally extending arms which are in turn supported by brackets 85, 96, 93, and 104. The plate 122 is provided with an aperture in front of each of the copying lenses. These apertures frame light rays for the films when the shutter is "open" and during the movement of the shutter the plate obstructs any stray light rays which might cause a blurring of the image on the film.

Fig. 4 illustrates the upper shutter 58 in appropriate position to expose frames of the upper film which are immediately to the rear of the upper filters 42, 43, 44, 45, 46, and 47 which in turn receive light rays from upper copying lenses 30, 31, 32, 33, 34, and 35. During the time while shutter 58 is "open" the lower shutter 68 is closed, and this can be readily seen because the apertures in shutters 58 and 68 are in staggered relation to each other, that is, the apertures of the upper shutter are spaced apart the length of one aperture, and the apertures on the lower shutter are in vertical alignment with the spaces between the apertures of the upper shutter. The upper shutter and film are at rest in Fig. 4 because teeth 108 and 120 are out of engagement with pinions 110 and 94 respectively. However, during the time when pinions 110 and 94 are at rest, pinion 105 is being driven by teeth 119 and is approaching the end of its movement as can be clearly seen in Fig. 5. As soon as teeth 119 disengage the teeth of pinion 105, lower film 121 will have been moved into position for exposure, and the advancement of teeth 108 of gear 107 to engagement with pinion 110 will cause the rotation of shaft 111, gear 112, gear 113, shaft 78, and shutter drums 63 and 77. This rotation will cause the "closing" of upper shutter 58 and the "opening" of lower shutter 68. Since the apertures in upper shutter 58 are in line with each other and on opposite sections of the shutter belt during exposure, the movement of the shutter belt will cause the openings to the lenses to be closed from opposite sides at the same time; it can be seen that the closing will be extremely rapid and the polygonal shape of the apertures of the shutter belt will cause a closing which is quite similar to that of the iris shutter. At the moment the upper shutter belt has moved a sufficient distance to close the upper frames from the light rays the apertures in the lower belt start to come into alignment to expose the lower frame; the movement of the upper belt continues, however, while the lower belt is opening the apertures and until the lower frames are completely exposed. When the closing and opening have been completed the teeth 120 mesh with pinion 94 and advance upper film 59 to the appropriate position for the next successive exposure.

It can be seen that it is necessary in this form of construction to move the film a much greater distance than it is to move the shutter. Moving the shutter a distance equal to one-half the length of an aperture causes the closing of one series of frames because opposite ends of the apertures in the spaced sides of the belts move toward each other at the same speed and meet on the axes of the lenses; the closing speed is thus doubled. The movement of the closing shutter however continues another half space in order to be in position for a subsequent, rapid exposure; each shutter thus moves one whole space during the movement of the other one. After the movement of the shutters has ceased the film behind the closed shutter is moved a distance of six spaces in order to put it in position for subsequent exposure. This is necessary in order to move the unexposed film between lenses 30 and 31 to a position immediately in line with lens 33 so that it may be exposed when the shutter in front of lens 33 is open. The film immediately in line with lens 30 as shown in Fig. 4 is moved to the space immediately to the left of lens 33, and as a result there are no blank spaces left on the film. The bottom film is moved in a similar manner although the shutter causes exposure at a different interval of time. The closing or opening of the shutter continues during one-fourteenth of the rotation of shaft 106, and the movement of the upper or lower film continues during six-fourteenths of the rotation of shaft 106.

The shutters may be arranged so that the opposite sides straddle the lenses, that is, the lenses may be placed between the spaced parallel sides of the shutter and in this case it would be necessary for the shutter to move a distance equal to the entire length of one aperture in order to shut the lenses from the light rays; this distance would also cause the exposure of the other series of lenses and consequently the shutting and exposing would occur simultaneously.

This apparatus and method produce film which may be employed with a projector which does not need the conventional rotary type of shutter, and the bothersome flicker of motion picture will be entirely eliminated because projection will be constant for while one series of frames is being advanced another series may be projected upon the screen.

A camera and method of photography for color pictures is disclosed and claimed in an application filed by me on September 22, 1933, given Serial Number 690,555 and given the name Method and apparatus for photography and projection.

A projector and method of projection are disclosed and claimed in an application, entitled Methods of and apparatus for stereoscopic projection, Serial No. 705,342, filed January 5, 1934.

While I have illustrated and described my preferred apparatus and method, I do not wish to be limited to the details shown herein but wish to avail myself of any and all variations coming within the scope of the appended claims.

Having thus described my invention, what I claim as new and desire to secure by Letters Patent is:

1. Photographic apparatus comprising lenses for transmitting light rays from a subject desired to be photographed to two series of frames of photographic sensitized material, a movable endless belt shutter having opposite series of exposure apertures therein for exposing one series of frames, a movable endless belt shutter having opposite series of exposure apertures therein for exposing the other series of frames, means for causing the movement of said belt shutters so as to cause the apertures of one belt shutter to be aligned while the apertures of the other belt shutter are out of alignment, and means for changing one series of frames of photographic sensitized material while the other series of frames is being exposed by the aligned exposure apertures of its cooperating belt shutter.

2. Photographic apparatus comprising lenses for transmitting light rays from a subject desired to be photographed to two films of photographic sensitized material, means for governing the exposure of said films of sensitized material, said last mentioned means comprising a plurality of endless belt shutters having alternate exposure apertures and alternate opaque portions thereon, said belt shutters having opposite portions movable in opposite directions, said movement in opposite directions being adapted to cause said exposure apertures to be brought into and removed from alignment, and said movement also being adapted to cause exposure of said photographic sensitized material beginning from its optic axis and being adapted to start shutting said photographic sensitized material from its outer edges, and means for synchronizing the movements of said belt shutters so that one of them is causing exposure while another is shutting light rays from the film for which it governs exposure.

3. Photographic apparatus comprising two main lens systems spaced apart a considerable distance, catoptric means mounted between said main lens systems and adapted to direct light rays laterally and to said main lens systems, a screen for receiving light rays from said main lens systems, and means for photographing the images on said screens comprising two series of lenses for transmitting light rays from the images on said screens to two series of frames of photographic material, means for simultaneously exposing one series of frames of photographic material to the light rays transmitted by one series of said lenses and shutting the other series of frames of photographic material from the light rays of the images on said screens, and means for replacing said second mentioned series of frames with an unexposed series of frames during the exposure of said first mentioned series of frames.

4. Stereoscopic photographic apparatus comprising two parallel photographic systems having their objective lenses spaced apart a greater distance than the correct interpupilary distance so as to provide sufficient space for a receiving screen for the objective lens of each of said photographic systems screens for receiving light from said objective lenses means for photographing the images received by said objective lenses and transmitted to said screens, and catoptric means for receiving light rays from the object desired to be photographed and directing said rays outwardly laterally to the objective lenses of said photographic systems.

5. The method of stereoscopic photography comprising receiving light rays from a subject desired to be photographed from two points of view spaced apart the correct interpupilary distance, directing said light rays outwardly laterally from each of said points of view, receiving said light rays from each of said points of view through the main lenses of two distinct photographic systems, receiving light rays from said lenses on photographic screens, and photographing the images on said screens.

6. The method of photography comprising simultaneously exposing alternate frames of one sensitized film and shutting alternate frames of the same film from the light rays of the subject desired to be photographed, and at the same time shutting exposed alternate frames of another film from the light rays of the subject desired to be photographed and replacing said last mentioned alternate exposed frames of said second mentioned film with alternate unexposed frames during the time the first mentioned alternate frames are being exposed so as to reduce time and film movement necessary for subsequent exposures.

7. The method of photography comprising simultaneously moving a sensitized film into photographing position and exposing alternate frames thereof while shutting alternate frames on the same film strip and during the same time shutting the alternately exposed frames of another sensitized film and replacing said alternate exposed frames with a series of unexposed alternate frames on said second mentioned film so as to place them in position for subsequent exposure, said steps being arranged to reduce time and film movement necessary for subsequent exposures.

8. Photographic apparatus comprising two series of lenses for transmitting light rays from a subject desired to be photographed to two series of alternate frames of two films of photographic sensitized material, means for exposing one series of alternate frames of one film and simultaneously shutting other alternate frames on said film from the light rays transmitted by one series of said lenses, means for shutting the second sensitized film from the light rays of the subject during the exposure of said first mentioned series of alternate frames, said means being adapted to expose and shut alternate frames on said second film simultaneously, and means for moving said second mentioned film into position for exposure of alternate frames thereof, said last mentioned means being operable to move said second mentioned film during the exposure of said first mentioned series of alternate frames.

9. Photographic apparatus comprising lenses for transmitting light rays from a subject desired to be photographed to two series of frames of photographic sensitized material on two films, means for governing the exposure of the frames of said films, said means being adapted to shut and expose simultaneously alternate frames of each one of said films at alternate times, and means for moving one of said films so as to place unexposed alternate frames thereof in position for exposure, said last mentioned means being operable during the time the alternate frames of the other of said films are being exposed so as to reduce the film movement and the time necessary therefor.

ALLEN L. BARNES.